(12) United States Patent
Chai et al.

(10) Patent No.: US 11,874,984 B2
(45) Date of Patent: Jan. 16, 2024

(54) TOUCH DISPLAY PANEL AND MANUFACTURING METHOD THEREFOR, AND TOUCH DISPLAY DEVICE

(71) Applicants: Chengdu BOE Optoelectronics Technology Co., Ltd., Sichuan (CN); BOE Technology Group Co., Ltd., Beijing (CN)

(72) Inventors: Yuanyuan Chai, Beijing (CN); Yangpeng Wang, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/799,283

(22) PCT Filed: Oct. 13, 2021

(86) PCT No.: PCT/CN2021/123449
§ 371 (c)(1),
(2) Date: Aug. 12, 2022

(87) PCT Pub. No.: WO2022/100342
PCT Pub. Date: May 19, 2022

(65) Prior Publication Data
US 2023/0078619 A1 Mar. 16, 2023

(30) Foreign Application Priority Data
Nov. 10, 2020 (CN) .......................... 202011249156.5

(51) Int. Cl.
*G06F 3/041* (2006.01)
*G06F 3/044* (2006.01)
(Continued)

(52) U.S. Cl.
CPC .......... *G06F 3/0412* (2013.01); *G06F 3/0445* (2019.05); *G06F 3/0446* (2019.05);
(Continued)

(58) Field of Classification Search
CPC .... H10K 59/131; H10K 59/40; H10K 50/844; H10K 59/00–95; G06F 3/0448;
(Continued)

(56) References Cited

U.S. PATENT DOCUMENTS

2014/0176844 A1 6/2014 Yanagisawa
2016/0218151 A1* 7/2016 Kwon ........................ G06F 1/16
(Continued)

FOREIGN PATENT DOCUMENTS

CN 109901747 A 6/2019
CN 111258456 A 6/2020
(Continued)

OTHER PUBLICATIONS

International Search Report for PCT/CN2021/123449 dated Dec. 27, 2021.

*Primary Examiner* — Sanjiv D. Patel
(74) *Attorney, Agent, or Firm* — Ling Wu; Stephen Yang; Ling and Yang Intellectual Property (57) ABSTRACT

A touch display panel and a manufacturing method therefor, and a touch display device. The touch display panel comprises a touch display region and a peripheral region. The touch display region comprises a through hole, a through hole detection region surrounding the through hole, and a transition connection region located between the through hole detection region and the peripheral region. The through hole detection region comprises an annular crack detection line and an annular isolation line. The transition connection region comprises a transition crack detection line and a
(Continued)

transition isolation line. The peripheral region comprises an edge crack detection line and an edge isolation line.

20 Claims, 6 Drawing Sheets

(51) Int. Cl.
 *G09G 3/00* (2006.01)
 *G09G 3/3225* (2016.01)
(52) U.S. Cl.
 CPC ... *G09G 3/006* (2013.01); *G06F 2203/04103* (2013.01); *G06F 2203/04111* (2013.01); *G09G 3/3225* (2013.01); *G09G 2330/12* (2013.01)
(58) Field of Classification Search
 CPC ............ G06F 3/0443; G06F 3/0412; G06F 2203/04103; G06F 3/044; G06F 3/04164; G06F 3/0446; G06F 3/041–047; G06F 2203/041–04114
 See application file for complete search history.

(56) References Cited

U.S. PATENT DOCUMENTS

| | | | |
|---|---|---|---|
| 2019/0146608 A1* | 5/2019 | Lee | G06F 3/0416 345/174 |
| 2020/0175901 A1* | 6/2020 | Lee | H10K 59/131 |
| 2020/0242986 A1 | 7/2020 | Lee et al. | |
| 2020/0273919 A1* | 8/2020 | Ding | H10K 50/841 |
| 2021/0057505 A1 | 2/2021 | Lee et al. | |

FOREIGN PATENT DOCUMENTS

| | | |
|---|---|---|
| CN | 111509006 A | 8/2020 |
| CN | 112328112 A | 2/2021 |
| CN | 112397557 A | 2/2021 |

* cited by examiner

FIG. 9 ated of PCT Application No. PCT/CN2021/123449, which is filed on Oct. 13, 2021 and claims priority of Chinese Patent Application No. 202011249156.5, filed to the CNIPA on Nov. 10, 2020 and entitled "Touch Display Panel and Manufacturing Method Therefor, and Touch Display Device," the contents of which should be construed as being incorporated herein by reference.

TECHNICAL FIELD

The present disclosure relates to, but is not limited to, the field of display technology, and particularly relates to a touch display panel and a manufacturing method for the touch display panel, and a touch display device.

BACKGROUND

With rapid development of display technologies, touch technologies have been applied to various electronic devices and various fields, and are increasingly popular among a wide variety of users. Touch panels may be divided into types of capacitive, resistive, infrared, surface acoustic wave, electromagnetic, vibration wave induction and frustrated total internal reflection optical sensor, etc. according to operation principles. Based on a unique touch principle, capacitive touch screens are widely used in various electronic interactive scene devices due to advantages such as high sensitivity, long service life, and high light transmittance.

In order to achieve a larger screen ratio, an in-screen punch-hole technology is used in some display panels, that is, a punch-hole region for placing hardware such as a front camera is disposed in an active area. For the display panel with integrated touch function, the hole position is designed with a Panel Crack Detection (PCD) line for detecting whether the hole edge is broken or not caused by hole punching. However, the PCD line will couple with the touch electrode, which will bring noise to normal touch signals, and finally lead to the phenomenon of "random reporting points" and "random operation" at the hole position, thereby reducing the touch performance.

SUMMARY

The following is a summary of subject matters described herein in detail. The summary is not intended to limit the protection scope of claims.

An embodiment of the present application provides a touch display panel, including a substrate, a first metal layer disposed on the substrate, an insulating layer disposed on a side of the first metal layer away from the substrate, and a second metal layer disposed on a side of the insulating layer away from the first metal layer. One of the first metal layer and the second metal layer includes multiple connection bridges, and the other of the first metal layer and the second metal layer includes a touch electrode and a through hole. The touch electrode includes a first electrode and a second electrode. The first electrode includes multiple first sub-electrodes arranged in a first direction, and adjacent first sub-electrodes are bridged by the connection bridge. The second electrode includes multiple second sub-electrodes arranged in a second direction, and two adjacent second sub-electrodes are connected with each other in the second direction. The through hole penetrates the first sub-electrodes and the second sub-electrodes. Any one or more of the first metal layer and the second metal layer further includes an annular crack detection line surrounding the through hole and an annular isolation line surrounding the annular crack detection line. An orthographic projection of the annular crack detection line on the substrate is a first annular shape, an orthographic projection of the annular isolation line on the substrate is a second annular shape, and a side of the first annular shape close to the second annular shape is within a range of a side of the second annular shape close to the first annular shape.

In an exemplary embodiment, the touch display panel includes a substrate, a first metal layer disposed on the substrate, an insulating layer disposed on a side of the first metal layer away from the substrate, and a second metal layer disposed on a side of the insulating layer away from the first metal layer, wherein:

one of the first metal layer and the second metal layer includes multiple connection bridges, and the other of the first metal layer and the second metal layer includes a touch electrode and a through hole, the touch electrode includes a first electrode and a second electrode, the first electrode includes multiple first sub-electrodes arranged in a first direction, and adjacent first sub-electrodes are bridged by the connection bridge; the second electrode includes multiple second sub-electrodes arranged in a second direction, and two adjacent second sub-electrodes in the second direction are connected with each other; the through hole penetrates the first sub-electrodes and the second sub-electrodes.

In an exemplary embodiment, the annular crack detection line, the annular isolation line, an edge crack detection line, an edge isolation line, a transition crack detection line, and a transition isolation line are located on one or more of the first metal layer and the second metal layer.

In an exemplary embodiment, the first sub-electrode includes multiple first protrusions and first spacers located between the multiple first protrusions, and the second sub-electrode includes multiple second protrusions and second spacers between the multiple second protrusions. The first protrusions are located in the second spacers, and the second protrusions are located in the first spacers.

In an exemplary embodiment, one of the first metal layer and the second metal layer further includes a ground wire connecting line, and the other of the first metal layer and the second metal layer further includes a ground wire. The ground wire and the ground wire connecting line are located in the peripheral region, an orthographic projection of the ground wire connecting line on the substrate overlaps an orthographic projection of the edge crack detection line on the substrate, and the ground wires on both sides of the ground wire connecting line in the second direction are electrically connected to the ground wire connecting line by means of a via on the insulating layer.

In an exemplary embodiment, one of the first metal layer and the second metal layer further includes a ground wire located in the peripheral region, and an orthographic projection of the ground wire on the substrate overlaps an orthographic projection of the edge crack detection line on the substrate.

In an exemplary embodiment, one of the first metal layer and the second metal layer further includes a touch lead connecting wire, and the other of the first metal layer and the second metal layer further includes a touch lead. The touch lead and the touch lead connecting wire are located in the peripheral region. An orthographic projection of the touch lead connecting line on the substrate overlaps an orthographic projection of the edge crack detection line on the substrate, and the orthographic projection of the touch lead connecting line on the substrate overlaps an orthographic projection of the edge isolation line on the substrate. The touch leads on both sides of the touch lead connecting line in the second direction are electrically connected to the touch lead connecting line by means of a via on the insulating layer.

In an exemplary embodiment, one of the first metal layer and the second metal layer further includes a touch lead located in the peripheral region. An orthographic projection of the touch lead on the substrate overlaps an orthographic projection of the edge crack detection line on the substrate, and the orthographic projection of the touch lead on the substrate overlaps an orthographic projection of the edge isolation line on the substrate. The touch lead is electrically connected to the touch electrode by means of a via on the insulating layer.

In an exemplary embodiment, one of the first metal layer and the second metal layer further includes an electrode connecting line located in the transition connection region, and the second sub-electrodes on both sides of the transition connection region in the second direction are electrically connected to the electrode connecting line by means of a via on the insulating layer.

In an exemplary embodiment, the touch display panel further includes an electrode connecting line. The transition crack detection line and the transition isolation line are located in one of the first metal layer and the second metal layer, and the electrode connecting line is located in the other of the first metal layer and the second metal layer. The electrode connecting line is located in the transition connection region, and the second sub-electrodes on both sides of the transition connection region in the second direction are electrically connected by means of the electrode connecting line.

An embodiment of the present disclosure further provides a touch display device, including a touch display panel as described above.

An embodiment of the present disclosure further provides a manufacturing method for a touch display panel, including: forming a first metal layer on a substrate; forming an insulating layer on a side of the first metal layer away from the substrate; and forming a second metal layer on a side of the insulating layer away from the first metal layer, wherein one of the first metal layer and the second metal layer includes multiple connection bridges, the other of the first metal layer and the second metal layer includes a first electrode, a second electrode and a through hole, the first electrode includes multiple first sub-electrodes arranged in a first direction, adjacent first sub-electrodes are bridged by the connection bridge; the second electrode includes multiple second sub-electrodes arranged in a second direction, and two adjacent second sub-electrodes are connected with each other in the second direction; any one or more of the first metal layer and the second metal layer further includes an annular crack detection line surrounding the through hole and an annular isolation line surrounding the annular crack detection line, an orthographic projection of the annular crack detection line on the substrate is a first annular shape, an orthographic projection of the annular isolation line on the substrate is a second annular shape, and a side of the first annular shape close to the second annular shape is within a range of a side of the second annular shape close to the first annular shape.

Other aspects will become apparent upon reading and understanding of accompanying drawings and the detailed description.

BRIEF DESCRIPTION OF DRAWINGS

The drawings are intended to provide a further understanding of technical solutions of the present disclosure and form a part of the specification, and are used to explain the technical solutions of the present disclosure together with embodiments of the present disclosure, and not intended to form limitations on the technical solutions of the present disclosure. Shapes and sizes of various components in the drawings do not reflect actual scales, and are only intended to schematically illustrate contents of the present disclosure.

DETAILED DESCRIPTION

Implementations of the present disclosure will be described further in detail below with reference to the accompanying drawings and embodiments. Following embodiments serve to illustrate the present disclosure, but are not intended to limit the scope of the present disclosure. The embodiments in the present disclosure and features in the embodiments may be combined randomly with each other without conflict.

In practical application processes, in order to pursue a larger area of the active area and reduce bezels, some terminal manufacturers have begun to dispose mounting holes for reserving mounting positions of hardware such as front cameras, in an Active Area (AA) on a display panel.

In some touch display panels, a crack detection line is arranged at the position of the mounting hole, an end of the crack detection line is connected to a data line of the screen by means of a thin film transistor (TFT), and the crack detection line and the data line are respectively connected to a source electrode and a drain electrode of the TFT. When the screen is working properly, a signal on the data line will constantly change its voltage in the form of square wave, and the voltage variation range of the signal on the data line is roughly between 2V and 6V. Because of the parasitic capacitance of the TFT and the leakage of the TFT itself, the voltage on the crack detection line will be pulled by the signal on the data line through the TFT, resulting in unstable voltage on the crack detection line. The voltage fluctuation range on the crack detection line is about 0 mV to 100 mV. At the position of the mounting hole, the crack detection line passes through the touch driving electrode or the touch sensing electrode, and there is a coupling capacitance between the crack detection line and the touch driving electrode or the touch sensing electrode through which the crack detection line passes. The voltage change on the crack detection line will cause the voltage change of the touch electrode, which is the introduced touch noise.

An embodiment of the present disclosure provides a touch display panel, a manufacturing method for the touch display panel, and a touch control display device, which can effectively reduce the voltage change of a touch electrode caused by the voltage change of a crack detection line, that is, effectively reduce the touch control noise, and further improve the touch performance of the whole touch display panel.

An embodiment of the present disclosure provides a touch display panel, including a substrate, a touch display region and a peripheral region disposed on the substrate. The touch display region includes a touch electrode, a through hole penetrating the touch electrode, a through hole detection region surrounding the through hole, and a transition connection region between the through hole detection region and the peripheral region. The through hole detection region includes an annular crack detection line and an annular isolation line. The transition connection region includes a transition crack detection line and a transition isolation line. The peripheral region includes an edge crack detection line and an edge isolation line. The annular crack detection line is electrically connected to the edge crack detection line by means of the transition crack detection line. The annular isolation line is electrically connected to the edge isolation line by means of the transition isolation line. An orthographic projection of the edge isolation line on the substrate is located between an orthographic projection of the touch electrode on the substrate and an orthographic projection of the edge crack detection line on the substrate. An orthographic projection of the transition isolation line on the substrate is located between an orthographic projection of the transition crack detection line on the substrate and the orthographic projection of the touch electrode on the substrate. An orthographic projection of the annular crack detection line on the substrate is a first annular shape, an orthographic projection of the annular isolation line on the substrate is a second annular shape, and a side of the first annular shape close to the second annular shape is within a range of a side of the second annular shape close to the first annular shape.

By disposing an isolation line between the crack detection line and the touch electrode in the whole process, and by designing the isolation line to fully wrap the crack detection line, the touch display panel provided by the embodiment of the present disclosure plays an excellent shielding role, effectively reduces the voltage change of the touch electrode caused by the voltage change of the crack detection line, that is, effectively reduces the touch noise and improves the touch performance of the whole touch display panel.

The following describes the technical solution of the present disclosure through multiple embodiments.

Figure 1:
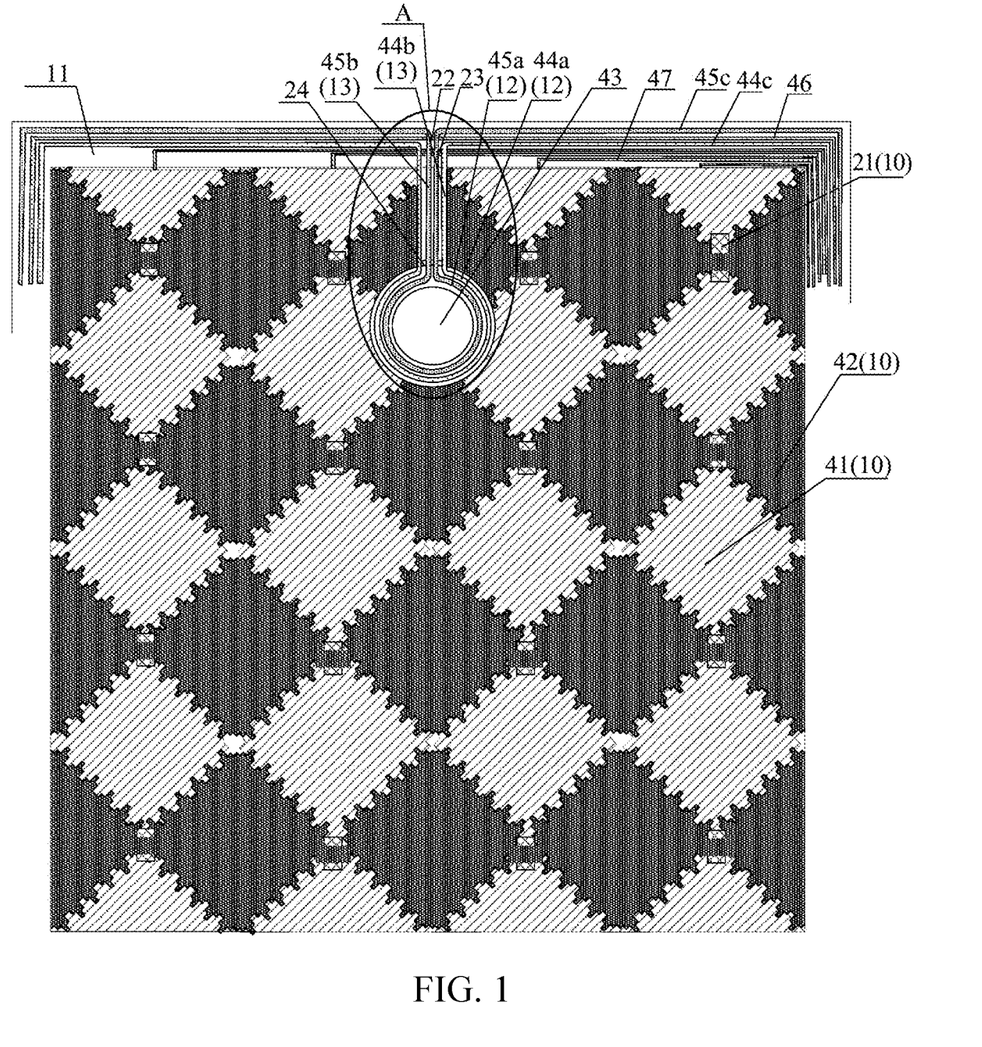
FIG. 1 is a schematic diagram of a structure of a touch display panel according to an embodiment of the present disclosure.
Figure 2:
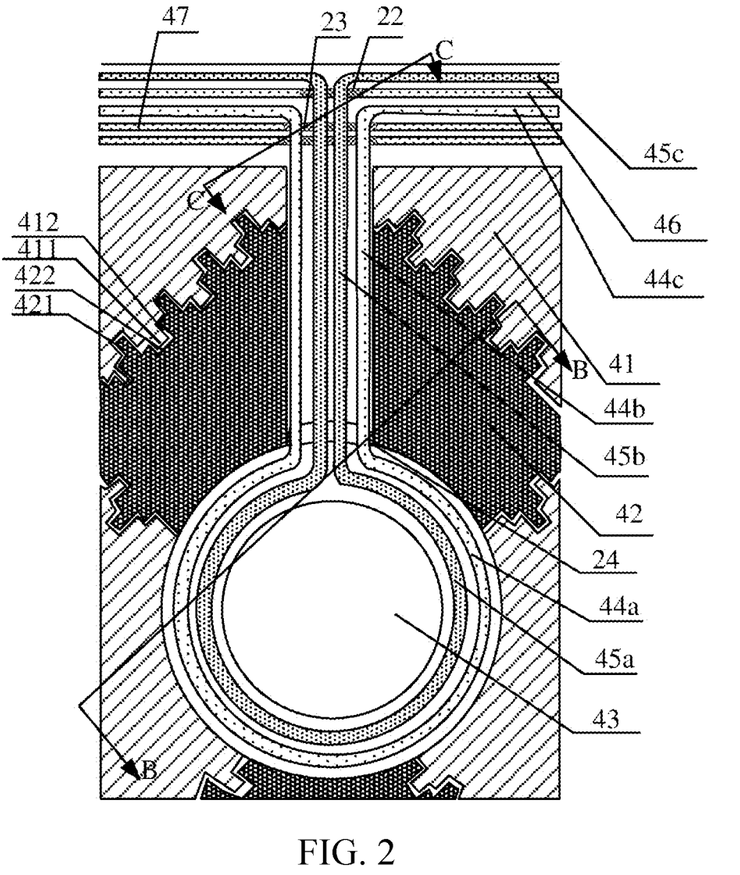
FIG. 2 is an enlarged schematic diagram of a structure of an area A of the touch display panel in FIG. 1.
Figure 3:
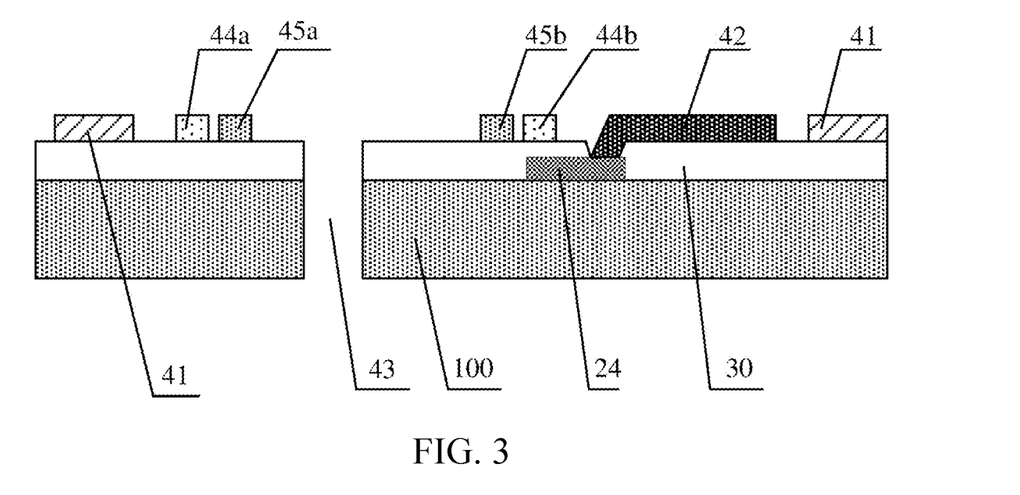
FIG. 3 is a schematic diagram of a sectional structure of the touch display panel in FIG. 2 along BB direction.
Figure 4:
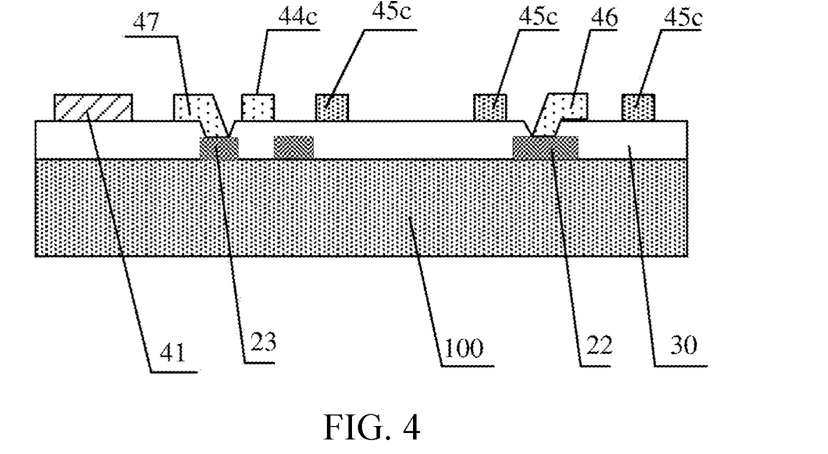
FIG. 4 is a schematic diagram of a sectional structure of the touch display panel in FIG. 2 along CC direction.

FIG. 1 is a schematic diagram of a structure of a touch display panel according to an embodiment of the present disclosure; FIG. 2 is an enlarged schematic diagram of a structure of an area A of the touch display panel in FIG. 1; FIG. 3 is a schematic diagram of a sectional structure of the touch display panel in FIG. 2 along BB direction; and FIG. 4 is a schematic diagram of a sectional structure of the touch display panel in FIG. 2 along CC direction. As shown in FIGS. 1-4, the touch display panel of this embodiment includes a substrate 100 and a touch display region 10 and a peripheral region 11 located on the substrate 100. The touch display region 10 includes a touch electrode, a through hole 43 penetrating the touch electrode, a through hole detection region 12 surrounding the through hole 43, and a transition connection region 13 located between the through hole detection region 12 and the peripheral region 11.

The through hole detection region 12 includes an annular crack detection line 45a and an annular isolation line 44a. The transition connection region 13 includes a transition crack detection line 45b and a transition isolation line 44b. The peripheral region 11 includes an edge crack detection line 45c and an edge isolation line 44c. The annular crack detection line 45a is electrically connected to the edge crack detection line 45c by means of the transition crack detection line 45b. The annular isolation line 44a is electrically connected to the edge isolation line 44c by means of the transition isolation line 44b.

An orthographic projection of the edge isolation line 44c on the substrate is located between an orthographic projection of the touch electrode on the substrate and an orthographic projection of the edge crack detection line 45c on the substrate. An orthographic projection of the transition isolation line 44b on the substrate is located between an orthographic projection of the transition crack detection line 45b on the substrate and the orthographic projection of the touch electrode on the substrate. An orthographic projection of the annular crack detection line 45a on the substrate is a first annular shape, an orthographic projection of the annular isolation line 44a on the substrate is a second annular shape, and a side of the first annular shape close to the second annular shape is within a range of a side of the second annular shape close to the first annular shape.

In an exemplary embodiment, the touch display panel includes a substrate 100, a first metal layer disposed on the substrate 100, an insulating layer 30 disposed on a side of the first metal layer away from the substrate 100, and a second metal layer disposed on a side of the insulating layer 30 away from the first metal layer, in a plane perpendicular to the touch display panel.

As shown in FIG. 1, one of the first metal layer and the second metal layer includes multiple connection bridges 21, and the other of the first metal layer and the second metal layer includes a touch electrode and a through hole 43. The touch electrode includes a first electrode 41 and a second electrode 42 which are disposed to intersect with each other. The first electrode 41 includes multiple first sub-electrodes arranged in a first direction, and adjacent first sub-electrodes are bridged by connection bridges 21. The second electrode 42 includes multiple second sub-electrodes arranged in a second direction, and two adjacent second sub-electrodes in the second direction are connected with each other. The through hole 43 penetrates the first sub-electrodes and the second sub-electrodes.

In an exemplary embodiment, as shown in FIGS. 3-6, the annular crack detection line 45a, the annular isolation line 44a, the transition crack detection line 45b, the transition isolation line 44b, the edge crack detection line 45c, and the edge isolation line 44c are located on any one or more of the first metal layer and the second metal layer.

In this embodiment, the annular crack detection line 45a, the transition crack detection line 45b, and the edge crack detection line 45c may be located on the same layer (i.e., the annular crack detection line 45a, the transition crack detection line 45b, and the edge crack detection line 45c may all be located on the first metal layer, or the annular crack detection line 45a, the transition crack detection line 45b, and the edge crack detection line 45c may all be located on the second metal layer), and may not be located on the same layer (i.e., a portion of the annular crack detection line 45a, the transition crack detection line 45b, and the edge crack detection line 45c is located on the first metal layer, and the other portion of the annular crack detection line 45a, the transition crack detection line 45b, and the edge crack detection line 45c is located on the second metal layer).

In this embodiment, the annular isolation line 44a, the transition isolation line 44b and the edge isolation line 44c may be located on the same layer (i.e., the annular isolation line 44a, the transition isolation line 44b and the edge isolation line 44c may all be located on the first metal layer, or the annular isolation line 44a, the transition isolation line 44b and the edge isolation line 44c may all be located on the second metal layer), and may not be located on the same layer (i.e., a portion of the annular isolation line 44a, the transition isolation line 44b and the edge isolation line 44c is located on the first metal layer, and the other portion of the annular isolation line 44a, the transition isolation line 44b and the edge isolation line 44c is located on the second metal layer).

In this embodiment, crack detection lines (including any one or more of the annular crack detection line 45a, the transition crack detection line 45b, and the edge crack detection line 45c) and isolation lines (including any one or more of the annular isolation line 44a, the transition isolation line 44b, and the edge isolation line 44c) may be located on the same layer (e.g., the annular crack detection line 45a, the transition crack detection line 45b, the edge crack detection line 45c, the annular isolation line 44a, the transition isolation line 44b, and the edge isolation line 44c may all be located on the first metal layer, or may all be located on the second metal layer), or not on the same layer (for example, a portion of the crack detection lines and the isolation lines is located on the first metal layer, and the other portion of the crack detection lines and the isolation lines is located on the second metal layer).

In an exemplary embodiment, as shown in FIGS. 1 and 2, the first sub-electrode includes multiple first protrusions 411 and first spacers 412 located between the multiple first protrusions 411, and the second sub-electrode includes multiple second protrusions 421 and second spacers 422 between the multiple second protrusions 421. The first protrusions 411 are located in the second spacers 422, and the second protrusions 421 are located in the first spacers 412.

In an exemplary embodiment, the edge isolation line 44c is connected to the touch IC. The touch IC transmits a shielding signal to the through hole region by means of the edge isolation line 44c, the transition isolation line 44b and the annular isolation line 44a, and effectively reduces the voltage change of the touch electrode caused by the voltage change on the crack detection line by using the shielding effect of the isolation lines, that is, effectively reduces the touch noise, so that the touch display device exhibits excellent touch performance.

In an exemplary embodiment, as shown in FIG. 2, the edge isolation line 44c includes two first connection ends, and the edge crack detection line 45c includes two second connection ends. The annular isolation line 44a includes two third connection ends, and the annular crack detection line 45a includes two fourth connection ends. The transition connection region includes two transition isolation lines 44b and two transition crack detection lines 45b.

One of the first connection ends and one of the third connection ends are connected by one of the transition isolation lines 44b, and the other of the first connection ends and the other of the third connection ends are connected by the other of the transition isolation lines 44b. One of the second connection ends and one of the fourth connection ends are connected by one of the transition crack detection lines 45b, and the other of the second connection ends and the other of the fourth connection ends are connected by the other of the transition crack detection lines 45b.

In an exemplary embodiment, as shown in FIGS. 2 and 4, one of the first metal layer and the second metal layer further includes a ground wire connecting line 22, and the other of the first metal layer and the second metal layer includes an edge crack detection line 45c and a ground wire 46. The ground wire 46 and the ground wire connecting line 22 are located in the peripheral region 11. An orthographic projection of the ground wire connecting line 22 on the substrate overlaps an orthographic projection of the edge crack detection line 45c on the substrate. The ground wires 46 on both sides of the ground wire connecting line 22 in the second direction are electrically connected to the ground wire connecting line 22 by means of a via on the insulating layer.

Figure 6:
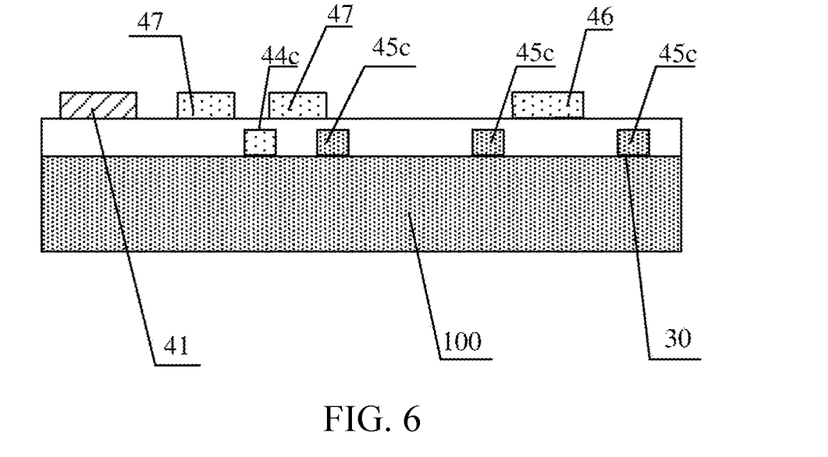
FIG. 6 is a schematic diagram of another sectional structure of the touch display panel in FIG. 2 along CC direction.

In another exemplary embodiment, as shown in FIGS. 2 and 6, one of the first metal layer and the second metal layer further includes a ground wire 46, and the other of the first metal layer and the second metal layer includes an edge crack detection line 45c. The ground wire 46 is located in the peripheral region, and an orthographic projection of the ground wire 46 on the substrate overlaps an orthographic projection of the edge crack detection line 45c on the substrate.

In an exemplary embodiment, as shown in FIGS. 2 and 4, one of the first metal layer and the second metal layer further includes a touch lead connecting line 23, and the other of the first metal layer and the second metal layer includes an edge isolation line 44c, an edge crack detection line 45c and a touch lead 47. The touch lead 47 and the touch lead connecting line 23 are located in the peripheral region 11. An orthographic projection of the touch lead connecting line 23 on the substrate overlaps an orthographic projection of the edge crack detection line 45c on the substrate. An orthographic projection of the touch lead connecting line 23 on the substrate overlaps an orthographic projection of the edge isolation line 44c on the substrate. The touch leads 47 on both sides of the touch lead connecting line 23 in the second direction is electrically connected to the touch lead connecting line 23 by means of a via in the insulating layer 30.

In another exemplary embodiment, as shown in FIGS. 2 and 6, one of the first metal layer and the second metal layer further includes a touch lead 47, and the other of the first metal layer and the second metal layer includes an edge isolation line 44c and an edge crack detection line 45c. The touch lead 47 is located in the peripheral region 11. An orthographic projection of the touch lead 47 on the substrate overlaps an orthographic projection of the edge crack detection line 45c on the substrate. An orthographic projection of the touch lead 47 on the substrate overlaps an orthographic projection of the edge isolation line 44c on the substrate. The touch lead 47 is electrically connected to the touch electrode by means of a via in the insulating layer 30.

In an exemplary embodiment, as shown in FIGS. 2 and 3, one of the first metal layer and the second metal layer further includes an electrode connecting line 24 located in the transition connection region 13, and the second sub-electrodes on both sides of the transition connection region 13 in the second direction are electrically connected to the electrode connecting line 24 by means of a via on the insulating layer 30.

Figure 5:
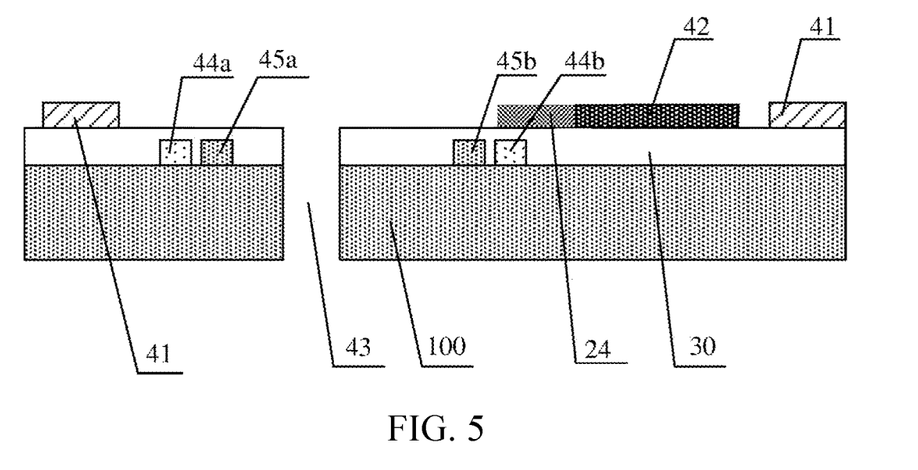
FIG. 5 is a schematic diagram of another sectional structure of the touch display panel in FIG. 2 along BB direction.

In an exemplary embodiment, as shown in FIGS. 2 and 5, the touch display panel further includes an electrode connecting line 24. The transition crack detection line 45b and the transition isolation line 44b are located in one of the first metal layer and the second metal layer, and the electrode connecting line 24 is located in the other of the first metal layer and the second metal layer. The electrode connecting line 24 is located in the transition connection region 13, and the second sub-electrodes on both sides of the transition connection region 13 in the second direction are electrically connected by means of the electrode connecting line 24.

The technical solution of this embodiment is further described below by a manufacturing process of a touch display panel according to this embodiment. The "patterning process" described in the embodiments includes processing such as depositing of a film layer, coating with a photoresist, mask exposure, development, etching, and stripping of the photoresist. The "lithography process" described in the embodiments includes processing such as coating of a film layer, mask exposure, and development, and is a mature manufacturing process in the related art. Deposition may be performed by using a known process such as sputtering, chemical vapor deposition or the like, coating may be performed by using a known coating process, and etching may be performed by using a known method, which is not limited here.

(1) A drive structure layer, a planarization layer, an anode, an organic light-emitting layer and a cathode are sequentially formed on an underlay substrate, and an encapsulation layer is formed at a side of the cathode away from the underlay substrate to obtain the substrate 100.

The drive structure layer may include multiple gate lines and multiple data lines, wherein the multiple gate lines and the multiple data lines may cross vertically to define multiple pixel units arranged in a matrix. Each pixel unit includes at least three sub-pixels, and each sub-pixel includes one or more Thin Film Transistors (TFTs). In this embodiment, one pixel unit may include three sub-pixels, namely a red sub-pixel R, a green sub-pixel G, and a blue sub-pixel B, respectively. Of course, a solution of this embodiment is also applicable to a case where one pixel unit includes four sub-pixels (a red sub-pixel R, a green sub-pixel G, a blue sub-pixel B, and a white sub-pixel W). In this embodiment, a manufacturing process of the drive structure layer may include: cleaning the underlay substrate first, then manufacturing an active layer on the underlay substrate by a patterning process, then forming a first insulating layer covering the active layer, forming the gate lines and gate electrodes on the first insulating layer, then forming a second insulating layer covering the gate lines and the gate electrodes, and forming data lines, source electrodes and drain electrodes on the second insulating layer. The thin film transistor may be a bottom gate structure, may also be a top gate structure, may be an amorphous silicon (a-Si) thin film transistor, or may be a low temperature polysilicon (LTPS) thin film transistor or an oxide thin film transistor, which are not limited here.

An anode of each sub-pixel is connected with a drain electrode of a thin film transistor in the sub-pixel through a via on the planarization layer. The organic light-emitting layer may include a hole injection layer (HIL), a hole transport layer (HTL), a light-emitting layer (EML), an electron transport layer (ETL) and an electron injection layer (EIL) which are stacked. Among them, the hole transport layer (HTL), the light-emitting layer (EML), the electron transport layer (ETL) and the electron injection layer (EIL) are sequentially disposed on the hole injection layer. The organic light-emitting layer is formed in a pixel opening region, to achieve connection between the organic light-emitting layer and the anode.

The encapsulation layer may serve a function of blocking water and oxygen, and prevent external water vapor from eroding the organic light-emitting layer (thus affecting the performance of the touch display panel). The encapsulation layer may have a laminated structure of inorganic material/organic material/inorganic material, and the organic material layer is disposed between two inorganic material layers.

Figure 7:
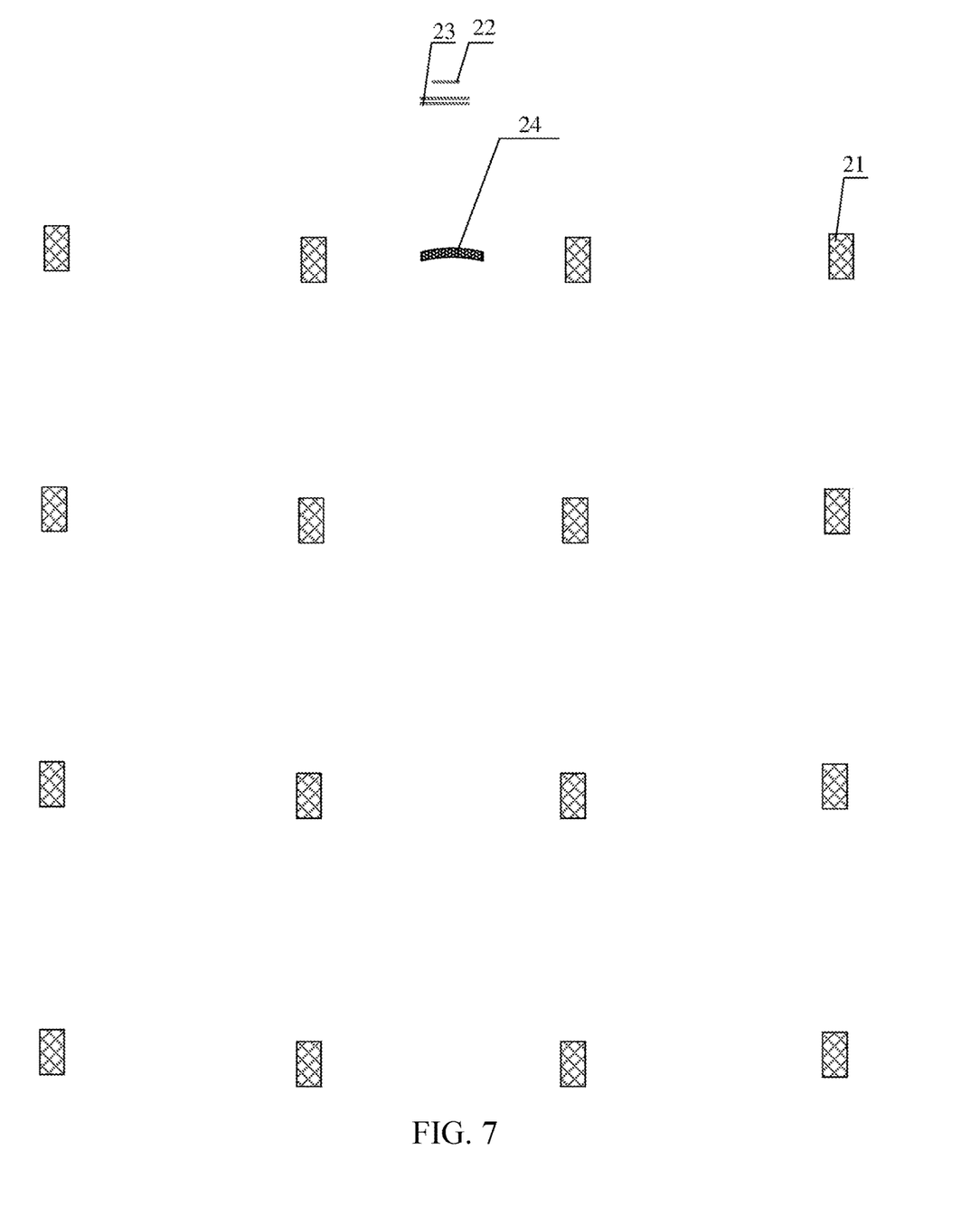
FIG. 7 is a schematic diagram of a substrate after a pattern of a first metal layer is formed according to an embodiment of the present disclosure.

(2) A pattern of the first metal layer is formed on a surface of the encapsulation layer away from the underlay substrate. As shown in FIG. 7, the first metal lay may include multiple connection bridges 21 disposed at intervals, a touch lead connecting line 23, a ground wire connecting line 22 and an electrode connecting line 24. The connection bridges 21 are located in an area where the touch electrode is to be formed. The touch lead connecting line 23 is located in an overlapping area of the touch lead to be formed and the crack detection line to be formed, and an overlapping area of the touch lead to be formed and the isolation line to be formed. The ground wire connecting line 22 is located in an overlapping area of the ground wire to be formed and the crack detection line to be formed. The electrode connecting line 24 is located in the transition connection region to be formed, and is located between the second sub-electrodes on both sides of the transition connection region to be formed in the second direction. Formation of the pattern of the first metal layer includes: depositing a conductive thin film on the substrate, coating a layer of photoresist on the conductive thin film, exposing and developing the photoresist by using a mask plate, forming an unexposed region at a pattern position of a bridge layer, retaining the photoresist, forming a fully exposed region at other positions, removing the photoresist, etching the conductive thin film in the fully exposed region and stripping the remaining photoresist, and forming the pattern of the first metal layer on the substrate. The conductive thin film may be made of a metal material or a transparent conductive material, such as indium tin oxide (ITO), indium zinc oxide (IZO), carbon nanotubes or graphene, etc.

Figure 8:
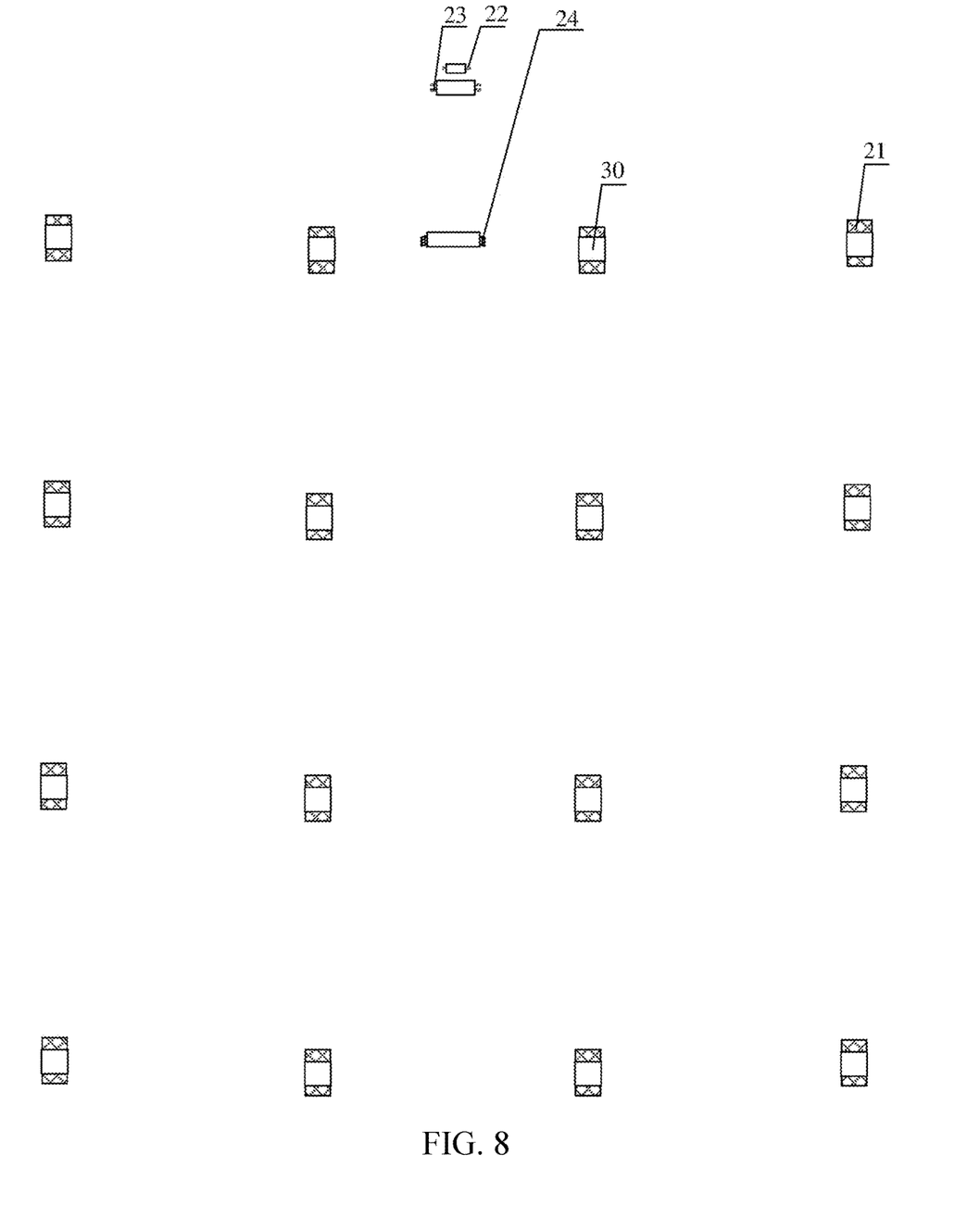
FIG. 8 is a schematic diagram of a substrate after a pattern of an insulating layer is formed according to an embodiment of the present disclosure.

(3) A pattern of the insulating layer 30 is formed on a surface of the first metal layer on a side away from the underlay substrate. As shown in FIG. 8, the insulating layer 30 includes multiple vias, including a first via, a second via, a third via and a fourth via. The first via is disposed at both ends of the connection bridge 21, the second via is disposed at both ends of the ground wire connecting line 22, the third via is disposed at both ends of the touch lead connecting line 23, and the fourth via is disposed at both ends of the electrode connecting line 24. The insulating layer may be made of a transparent material, so that the touch panel may be used for an integrated touch display panel.

(4) A pattern of the second metal layer is formed on a surface of the insulating layer 30 on a side away from the underlay substrate. As shown in FIGS. 1 and 2, the second metal layer may include patterns of a first electrode 41, a second electrode 42, a through hole 43, an annular crack detection line 45a, an annular isolation line 44a, an edge crack detection line 45c, an edge isolation line 44c, a transition crack detection line 45b, a transition isolation line 44b, a ground wire 46, and a touch lead 47. The first electrode 41 includes multiple first sub-electrodes arranged in a first direction, and two adjacent first sub-electrodes in the first direction are electrically connected to one connection bridge 21 by means of the first via. The second electrode 42 includes multiple second sub-electrodes arranged in a second direction, two adjacent second sub-electrodes in the second direction are connected with each other, and the first direction intersects with the second direction. The through hole 43 penetrates the first sub-electrode and the second sub-electrode. An orthographic projection of the annular crack detection line 45a on the substrate is a first annular shape, and an orthographic projection of the annular isolation line 44a on the substrate is a second annular shape. The first annular shape surrounds the through hole 43, the second annular shape surrounds the first annular shape, and an outer side of the first annular shape (i.e., a side away from the through hole) is located within a range of an inner side of the second annular shape (i.e., a side close to the through hole). The transition crack detection line 45b includes a first transition crack detection line and a second transition crack detection line. The transition isolation line 44b includes a first transition isolation line and a second transition isolation line. The edge isolation line 44d and the edge crack detection line 45c are disposed in the peripheral region, and the edge isolation line 44c is disposed between the display region and the edge crack detection line 45c. The edge isolation line 44c includes two first connection ends, and the edge crack detection line 45c including two second connection ends. The annular isolation line includes two third connection ends, and the annular crack detection line 45a includes two fourth connection ends. One of the first connection ends and one of the third connection ends are connected by the first transition isolation line. The other of the first connection ends and the other of the third connection ends are connected by the second transition isolation line. One of the second connection ends and one of the fourth connection ends are connected by the first transition crack detection line, and the other of the second connection ends and the other of the fourth connection ends are connected by the second transition crack detection line.

In this embodiment, the ground wire 46 is disposed between the edge crack detection line 45c and the edge isolation line 44c. The touch lead 47 is disposed between the edge isolation line 44c and the touch electrode. The ground wires 46 on both sides of the ground wire connecting wire 22 in the second direction are electrically connected to the ground wire connecting wire 22 by means of the second via. The touch leads 47 on both sides of the touch lead connecting line 23 in the second direction are electrically connected to the touch lead connecting line 23 by means of the third via. The second sub-electrodes on both sides of the transition connection region in the second direction are electrically connected to the electrode connecting line 24 by means of the fourth via.

In this embodiment, the first direction and the second direction are both perpendicular to a thickness direction of the encapsulation layer. Magnitude of an angle between the first direction and the second direction is not limited in the embodiments of the present disclosure, for example, the first direction and the second direction may be perpendicular to each other.

In this embodiment, the first sub-electrodes and the second sub-electrodes both have a grid structure, and materials of the first sub-electrodes and the second sub-electrodes are metal materials. Due to low resistance, good conductivity and high sensitivity of metal materials, transmission delays of electrical signals in the first sub-electrodes and the second sub-electrodes can be avoided, thus improving the touch effect. A shape of grid in the grid structure may be a regular polygon or an irregular polygon.

As can be seen from the above manufacturing process, by disposing an isolation line between the crack detection line and the touch electrode, and by the shielding effect of the isolation line, the touch display panel provided by the embodiment of the present disclosure effectively reduces the voltage change of the touch electrode caused by the voltage change of the crack detection line, that is, effectively reduces the touch noise, thereby improving the touch performance of the whole touch display panel.

Although this embodiment describes a process of manufacturing a touch display panel with an annular crack detection line 45a, an annular isolation line 44a, a transition crack detection line 45b, a transition isolation line 44b, an edge crack detection line 45c, an edge isolation line 44c, a ground wire 46, and a touch lead 47 all located on the second metal layer as examples, one or more of the annular crack detection line 45a, the annular isolation line 44a, the transition crack detection line 45b, the transition isolation line 44b, the edge crack detection line 45c, the edge isolation line 44c, the ground wire 46, and the touch lead 47 may also be located on the first metal layer in practice, which will not be limited in the present disclosure.

Figure 9:
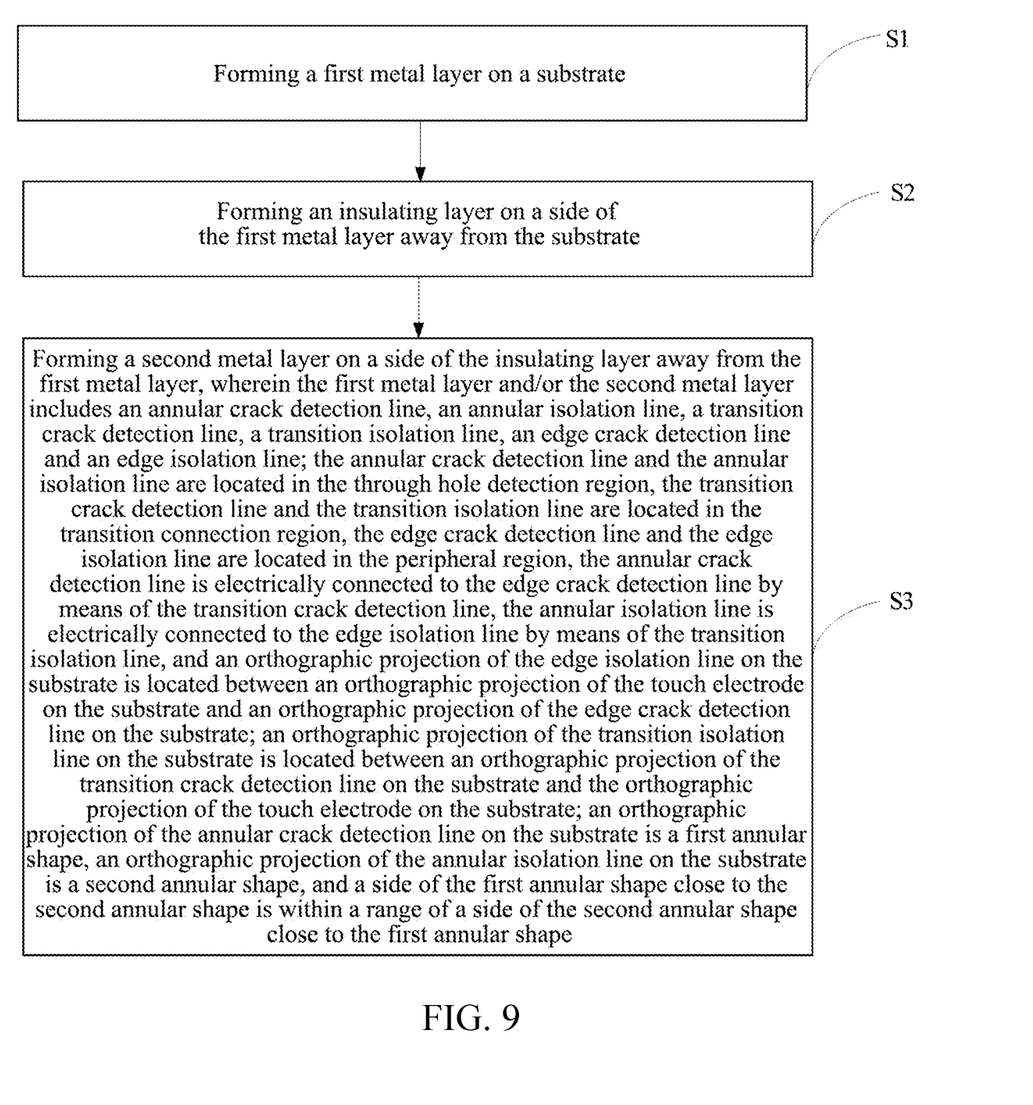
FIG. 9 is a schematic flowchart of a manufacturing method for a touch display panel according to an embodiment of the present disclosure.

An embodiment of the present disclosure further provides a manufacturing method for a touch display panel, wherein the touch display panel includes a substrate, a touch display region and a peripheral region located on the substrate, the touch display region includes a through hole region, a through hole detection region surrounding the through hole region and a transition connection region located between the through hole detection region and the peripheral region. As shown in FIG. 9, the manufacturing method for a touch display panel according to the embodiment of the present disclosure includes:

S1, forming a first metal layer on a substrate;

S2, forming an insulating layer on a side of the first metal layer away from the substrate; and S3, forming a second metal layer on a side of the insulating layer away from the first metal layer, wherein any one or more of the first metal layer and the second metal layer includes an annular crack detection line, an annular isolation line, a transition crack detection line, a transition isolation line, an edge crack detection line and an edge isolation line; the annular crack detection line and the annular isolation line are located in the through hole detection region, the transition crack detection line and the transition isolation line are located in the transition connection region, the edge crack detection line and the edge isolation line are located in the peripheral region, the annular crack detection line is electrically connected to the edge crack detection line by means of the transition crack detection line, the annular isolation line is electrically connected to the edge isolation line by means of the transition isolation line, and an orthographic projection of the edge isolation line on the substrate is located between an orthographic projection of the touch electrode on the substrate and an orthographic projection of the edge crack detection line on the substrate; an orthographic projection of the transition isolation line on the substrate is located between an orthographic projection of the transition crack detection line on the substrate and the orthographic projection of the touch electrode on the substrate; an orthographic projection of the annular crack detection line on the substrate is a first annular shape, an orthographic projection of the annular isolation line on the substrate is a second annular shape, and a side of the first annular shape close to the second annular shape is within a range of a side of the second annular shape close to the first annular shape.

In an exemplary embodiment, one of the first metal layer and the second metal layer includes multiple connection bridges, and the other of the first metal layer and the second metal layer includes a first electrode, a second electrode and a through hole, the first electrode includes multiple first sub-electrodes arranged in a first direction, and adjacent first sub-electrodes are bridged by the connection bridge; the second electrode includes multiple second sub-electrodes arranged in a second direction, and two adjacent second sub-electrodes in the second direction are connected with each other.

In an exemplary embodiment, one of the first metal layer and the second metal layer further includes a ground wire connecting line, and the other of the first metal layer and the second metal layer includes an edge crack detection line and a ground wire. The ground wire and the ground wire connecting line are located in the peripheral region. An orthographic projection of the ground wire connecting line on the substrate overlaps an orthographic projection of the edge crack detection line on the substrate. The ground wires on both sides of the ground wire connecting line in the second direction are electrically connected to the ground wire connecting line by means of a via in the insulating layer.

In another exemplary embodiment, one of the first metal layer and the second metal layer further includes a ground wire, and the other of the first metal layer and the second metal layer includes an edge crack detection line. The ground wire is located in the peripheral region, and an orthographic projection of the ground wire on the substrate overlaps an orthographic projection of the edge crack detection line on the substrate.

In an exemplary embodiment, one of the first metal layer and the second metal layer further includes a touch lead connecting line, and the other of the first metal layer and the second metal layer includes an edge isolation line, an edge crack detection line and a touch lead. The touch lead and the touch lead connecting line are located in the peripheral region. An orthographic projection of the touch lead connecting line on the substrate overlaps an orthographic projection of the edge crack detection line on the substrate. An orthographic projection of the touch lead connecting line on the substrate overlaps an orthographic projection of the edge isolation line on the substrate. The touch leads on both sides of the touch lead connecting line in the second direction is electrically connected to the touch lead connecting line through a via in the insulating layer.

In another exemplary embodiment, one of the first metal layer and the second metal layer further includes a touch lead, and the other of the first metal layer and the second metal layer includes an edge isolation line and an edge crack detection line. The touch lead is located in the peripheral region. An orthographic projection of the touch lead on the substrate overlaps an orthographic projection of the edge crack detection line on the substrate. An orthographic projection of the touch lead on the substrate overlaps an orthographic projection of the edge isolation line on the substrate. The touch lead is electrically connected to the touch electrode by means of a via in the insulating layer.

In an exemplary embodiment, one of the first metal layer and the second metal layer further includes an electrode connecting line located in the transition connection region, and the second sub-electrodes on both sides of the transition connection region in the second direction are electrically connected to the electrode connecting line by means of a via on the insulating layer.

In an exemplary embodiment, the touch display panel further includes an electrode connecting line. The transition crack detection line and the transition isolation line are located in one of the first metal layer and the second metal layer, and the electrode connecting line is located in the other of the first metal layer and the second metal layer. The electrode connecting line is located in the transition connection region, and the second sub-electrodes on both sides of the transition connection region in the second direction are electrically connected by means of the electrode connecting line.

By disposing an isolation line between the crack detection line and the touch electrode, and by the shielding effect of the isolation line, the manufacturing method for a touch display panel provided by the embodiment of the present disclosure effectively reduces the voltage change of the touch electrode caused by the voltage change of the crack detection line, that is, effectively reduces the touch noise, thereby improving the touch performance of the whole touch display panel.

An embodiment of the present disclosure further provides a touch display device which includes the touch display panel of the embodiment as described above. The touch display device may be any product or component with a display function, such as a mobile phone, a tablet computer, a television, a display, a laptop computer, a digital photo frame, a navigator, etc.

In descriptions of the embodiments of the present disclosure, orientations or positional relationships indicated by terms "middle", "upper", "lower", "front", "back", "vertical", "horizontal", "top", "bottom", "inside", "outside", and the like are based on orientations or positional relationships shown in the drawings, and are only for convenience of describing the present disclosure and simplifying the description, but are not intended to indicate or imply that a referred apparatus or element must have a specific orientation, or be constructed and operated in a particular orientation, and therefore they should not be construed as limitations on the present disclosure.

In the description of the embodiments of the present disclosure, unless otherwise explicitly specified and defined, the terms "install", "connect", "couple" should be understood in a broad sense, for example, a connection may be a fixed connection or a detachable connection, or an integrated connection; it may be a mechanical connection or an electrical connection; it may be a direct connection, or may be an indirect connection through an intermediary, or may be an internal connection between two elements. Those of ordinary skill in the art may understand specific meanings of these terms in the present disclosure according to specific situations.

Although the embodiments disclosed in the present disclosure are as above, the described contents are only embodiments used for convenience of understanding the present disclosure and are not intended to limit the present disclosure. Any person skilled in the art to which the present disclosure pertains may make any modification and variation in implementation forms and details without departing from the spirit and scope disclosed in the present disclosure. However, the scope of patent protection of the present disclosure is still subject to the scope defined by the appended claims.

The invention claimed is:

1. A touch display panel, comprising a substrate, and a touch display region and a peripheral region located on the substrate, the touch display region comprising a touch electrode, a through hole penetrating the touch electrode, a through hole detection region surrounding the through hole and a transition connection region located between the through hole detection region and the peripheral region, wherein:

the through hole detection region comprises an annular crack detection line and an annular isolation line, the transition connection region comprises a transition crack detection line and a transition isolation line, the peripheral region comprises an edge crack detection line and an edge isolation line, the annular crack detection line is electrically connected to the edge crack detection line by means of the transition crack detection line, and the annular isolation line is electrically connected to the edge isolation line by means of the transition isolation line, and the edge isolation line is electrically connected to a touch integrated circuit (IC) to input a shielding signal;

an orthographic projection of the edge isolation line on the substrate is located between an orthographic projection of the touch electrode on the substrate and an orthographic projection of the edge crack detection line on the substrate;

an orthographic projection of the transition isolation line on the substrate is located between an orthographic projection of the transition crack detection line on the substrate and the orthographic projection of the touch electrode on the substrate; and an orthographic projection of the annular crack detection line on the substrate is a first annular shape, an orthographic projection of the annular isolation line on the substrate is a second annular shape, and a side of the first annular shape close to the second annular shape is within a range of a side of the second annular shape close to the first annular shape.

2. The touch display panel according to claim 1, wherein the touch display panel comprises a substrate, a first metal layer disposed on the substrate, an insulating layer disposed on a side of the first metal layer away from the substrate, and a second metal layer disposed on a side of the insulating layer away from the first metal layer, wherein:

one of the first metal layer and the second metal layer comprises multiple connection bridges, and the other of the first metal layer and the second metal layer comprises a touch electrode and a through hole, the touch electrode comprises a first electrode and a second electrode, the first electrode comprises multiple first sub-electrodes arranged in a first direction, and adjacent first sub-electrodes are bridged by the connection bridge;

the second electrode comprises multiple second sub-electrodes arranged in a second direction, and two adjacent second sub-electrodes in the second direction are connected with each other; and the through hole penetrates the first sub-electrodes and the second sub-electrodes.

3. The touch display panel according to claim 2, wherein the annular crack detection line, the annular isolation line, an edge crack detection line, an edge isolation line, a transition crack detection line, and a transition isolation line are located on one or more of the first metal layer and the second metal layer.

4. The touch display panel according to claim 2, wherein the first sub-electrode comprises multiple first protrusions and first spacers located between the multiple first protrusions, and the second sub-electrode comprises multiple second protrusions and second spacers between the multiple second protrusions, the first protrusions are located in the second spacers, and the second protrusions are located in the first spacers.

5. The touch display panel according to claim 2, wherein one of the first metal layer and the second metal layer further comprises a ground wire connecting line, and the other of the first metal layer and the second metal layer further comprises a ground wire, the ground wire and the ground wire connecting line are located in the peripheral region, an orthographic projection of the ground wire connecting line on the substrate overlaps an orthographic projection of the edge crack detection line on the substrate, and the ground wires on both sides of the ground wire connecting line in the second direction are electrically connected to the ground wire connecting line by means of a via on the insulating layer.

6. The touch display panel according to claim 2, wherein one of the first metal layer and the second metal layer further comprises a ground wire located in the peripheral region, and an orthographic projection of the ground wire on the substrate overlaps an orthographic projection of the edge crack detection line on the substrate.

7. The touch display panel according to claim 2, wherein one of the first metal layer and the second metal layer further comprises a touch lead connecting line, and the other of the first metal layer and the second metal layer further comprises a touch lead, the touch lead and the touch lead connecting line are located in the peripheral region, an orthographic projection of the touch lead connecting line on the substrate overlaps an orthographic projection of the edge crack detection line on the substrate, the orthographic projection of the touch lead connecting line on the substrate overlaps an orthographic projection of the edge isolation line on the substrate, and the touch leads on both sides of the touch lead connecting line in the second direction are electrically connected to the touch lead connecting line by means of a via on the insulating layer.

8. The touch display panel according to claim 2, wherein one of the first metal layer and the second metal layer further comprises a touch lead located in the peripheral region, an orthographic projection of the touch lead on the substrate overlaps an orthographic projection of the edge crack detection line on the substrate, the orthographic projection of the touch lead on the substrate overlaps an orthographic projection of the edge isolation line on the substrate, and the touch lead is electrically connected to the touch electrode by means of a via on the insulating layer.

9. The touch display panel according to claim 2, wherein one of the first metal layer and the second metal layer further comprises an electrode connecting line located in the transition connection region, and the second sub-electrodes on both sides of the transition connection region in the second direction are electrically connected to the electrode connecting line by means of a via on the insulating layer.

10. The touch display panel according to claim 2, wherein the touch display panel further comprises an electrode connecting line, the transition crack detection line and the transition isolation line are located in one of the first metal layer and the second metal layer, the electrode connecting line is located in the other of the first metal layer and the second metal layer, the electrode connecting line is located in the transition connection region, and the second sub-electrodes on both sides of the transition connection region in the second direction are electrically connected by means of the electrode connecting line.

11. A touch display device, comprising the touch display panel according to claim 1.

12. A manufacturing method for a touch display panel, the touch display panel comprising a substrate, and a touch display region and a peripheral region located on the substrate, the touch display region comprising a through hole region, a through hole detection region surrounding the through hole region and a transition connection region located between the through hole detection region and the peripheral region, the manufacturing method comprising:

forming a first metal layer on a substrate;

forming an insulating layer at a side of the first metal layer away from the substrate; and forming a second metal layer on a side of the insulating layer away from the first metal layer, wherein any one or more of the first metal layer and the second metal layer comprises an annular crack detection line, an annular isolation line, a transition crack detection line, a transition isolation line, an edge crack detection line and an edge isolation line;

the annular crack detection line and the annular isolation line are located in the through hole detection region, the transition crack detection line and the transition isolation line are located in the transition connection region, the edge crack detection line and the edge isolation line are located in the peripheral region, the annular crack detection line is electrically connected to the edge crack detection line by means of the transition crack detection line, the annular isolation line is electrically connected to the edge isolation line by means of the transition isolation line, the edge isolation line is electrically connected to a touch integrated circuit (IC) to input a shielding signal, and an orthographic projection of the edge isolation line on the substrate is located between an orthographic projection of the touch electrode on the substrate and an orthographic projection of the edge crack detection line on the substrate;

an orthographic projection of the transition isolation line on the substrate is located between an orthographic projection of the transition crack detection line on the substrate and the orthographic projection of the touch electrode on the substrate; and an orthographic projection of the annular crack detection line on the substrate is a first annular shape, an orthographic projection of the annular isolation line on the substrate is a second annular shape, and a side of the first annular shape close to the second annular shape is within a range of a side of the second annular shape close to the first annular shape.

13. The manufacturing method according to claim 12, wherein one of the first metal layer and the second metal layer comprises multiple connection bridges, and the other of the first metal layer and the second metal layer comprises a touch electrode and a through hole, the touch electrode comprises a first electrode and a second electrode, the first electrode comprises multiple first sub-electrodes arranged in a first direction, and adjacent first sub-electrodes are bridged by the connection bridge;

the second electrode comprises multiple second sub-electrodes arranged in a second direction, and two adjacent second sub-electrodes in the second direction are connected with each other; and the through hole penetrates the first sub-electrodes and the second sub-electrodes.

14. The manufacturing method according to claim 13, wherein the first sub-electrode comprises multiple first protrusions and first spacers located between the multiple first protrusions, the second sub-electrode comprises multiple second protrusions and second spacers between the multiple second protrusions, and the first protrusions are located in the second spacers, and the second protrusions are located in the first spacers.

15. The manufacturing method according to claim 13, wherein one of the first metal layer and the second metal layer further comprises a ground wire connecting line, and the other of the first metal layer and the second metal layer further comprises a ground wire, the ground wire and the ground wire connecting line are located in the peripheral region, an orthographic projection of the ground wire connecting line on the substrate overlaps an orthographic projection of the edge crack detection line on the substrate, and the ground wires on both sides of the ground wire connecting line in the second direction are electrically connected to the ground wire connecting line by means of a via on the insulating layer.

16. The manufacturing method according to claim 13, wherein one of the first metal layer and the second metal layer further comprises an electrode connecting line located in the transition connection region, and the second sub-electrodes on both sides of the transition connection region in the second direction are electrically connected to the electrode connecting line by means of a via on the insulating layer.

17. The manufacturing method according to claim 13, wherein the touch display panel further comprises an electrode connecting line, the transition crack detection line and the transition isolation line are located in one of the first metal layer and the second metal layer, the electrode connecting line is located in the other of the first metal layer and the second metal layer, the electrode connecting line is located in the transition connection region, and the second sub-electrodes on both sides of the transition connection region in the second direction are electrically connected by means of the electrode connecting line.

18. The manufacturing method according to claim 12, wherein
- one of the first metal layer and the second metal layer further comprises a ground wire located in the peripheral region, and
- an orthographic projection of the ground wire on the substrate overlaps an orthographic projection of the edge crack detection line on the substrate.

19. The manufacturing method according to claim 12, wherein
- one of the first metal layer and the second metal layer further comprises a touch lead connecting line, and the other of the first metal layer and the second metal layer further comprises a touch lead,
- the touch lead and the touch lead connecting line are located in the peripheral region,
- an orthographic projection of the touch lead connecting line on the substrate overlaps an orthographic projection of the edge crack detection line on the substrate,
- the orthographic projection of the touch lead connecting line on the substrate overlaps an orthographic projection of the edge isolation line on the substrate, and
- the touch leads on both sides of the touch lead connecting line in the second direction are electrically connected to the touch lead connecting line by means of a via on the insulating layer.

20. The manufacturing method according to claim 12, wherein
- one of the first metal layer and the second metal layer further comprises a touch lead located in the peripheral region,
- an orthographic projection of the touch lead on the substrate overlaps an orthographic projection of the edge crack detection line on the substrate,
- the orthographic projection of the touch lead on the substrate overlaps an orthographic projection of the edge isolation line on the substrate, and
- the touch lead is electrically connected to the touch electrode by means of a via on the insulating layer.

\* \* \* \* \*